United States Patent [19]

Seo et al.

[11] 4,035,302

[45] July 12, 1977

[54] APPARATUS FOR SEPARATING OIL AND WATER

[75] Inventors: Masao Seo; Yasu Seo, both of Chofu, Japan

[73] Assignee: Masao Seo, Chofu, Japan

[21] Appl. No.: 703,110

[22] Filed: July 6, 1976

[30] Foreign Application Priority Data

July 16, 1975 Japan .................................. 50-126410

[51] Int. Cl.² ........................................ B01D 21/02
[52] U.S. Cl. ................................. 210/304; 210/513
[58] Field of Search ................... 210/23, 73, 83, 84, 210/336, 521, 522, 513, DIG. 5, 304, 310

[56] References Cited

U.S. PATENT DOCUMENTS

| | | | |
|---|---|---|---|
| 2,181,684 | 11/1939 | Walker | 210/84 X |
| 2,261,101 | 10/1941 | Erwin | 210/84 X |
| 2,638,221 | 5/1953 | Carroll | 210/23 R X |
| 3,208,596 | 9/1965 | Gravert | 210/23 R |
| 3,794,583 | 2/1974 | Rhodes | 210/DIG. 5 |
| 3,888,768 | 6/1975 | Graybill | 210/304 |
| 3,948,768 | 4/1976 | Chapman | 210/DIG. 5 |

Primary Examiner—Theodore A. Granger

[57] ABSTRACT

Apparatus for separating oil and water comprising a pipe coiled annularly along the inner surface of the upper portion of a treating chamber and containing therein a large number of small diameter members arranged parallel to one another. The pipe is connected at its lower end to an inlet for an oil and water liquid mixture and the pipe is open at its upper end to form a rough separating section having an upper oil accumulating portion with an oil discharge pipe. A distribution layer is mounted below the rough separating section to form a flow distribution section for passage of a roughly separated water therethrough. A filter tube having a wall composed of a filter layer comprising a mixture of lipophilic fibers and hydrophilic fibers is mounted in a lower portion of the treating chamber to form a fine separating section having an oil accumulating portion at the top thereof with an oil discharge pipe and a separated water discharge pipe at the bottom thereof.

9 Claims, 3 Drawing Figures

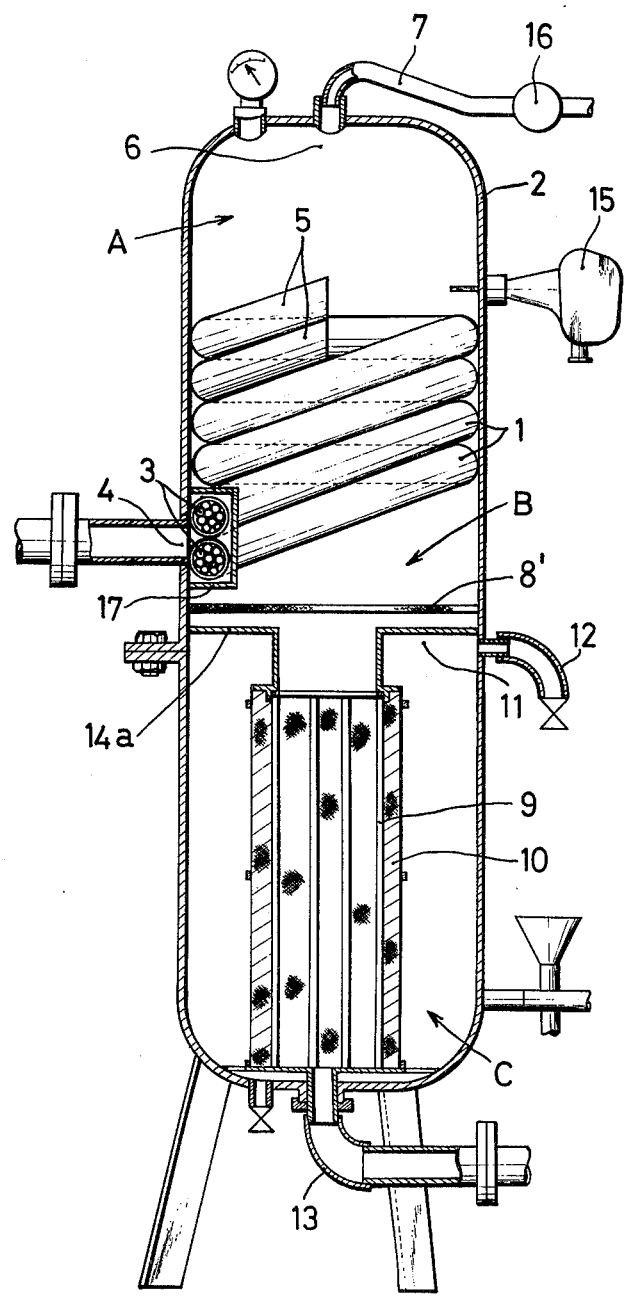

4,035,302

APPARATUS FOR SEPARATING OIL AND WATER

FIELD OF THE INVENTION

This invention relates to an apparatus for separating oil and water from a liquid mixture of water and oil such as mineral oil or the like. More particularly, this invention is directed to an apparatus for separating oil and water which comprises, in the combination of a flotation type separating means and an adsorption and aggregation type separating means, a rough separating section for separating oil particles large in floating ability, a fine separating section for separating oil particles small in floating ability and a flow distribution section located between the two sections for making the liquid uniform.

BACKGROUND

It has been conventional for the flotation type separating means to operate such that, during flowing movement of an oil and water liquid mixture, oil particles contained therein are floated due to the difference in specific gravity between oil and water and the oil particles are aggregated or flocculated on the surfaces of parallel plates. Accordingly, it is desirable in this case for the mixture of oil and water to flow through narrow-spaced parallel plates in the form of a laminar flow and its retention time is made as long as possible. For complying with these requirements, the apparatus becomes large in size and complicated in manufacture.

If an oil particle becomes very fine, the floating ability thereof is decreased and resistance to its floating is increased and the influence of the flowing movement acting thereon is also increased, and thus its floating becomes extremely slow. Accordingly, it has been hitherto difficult to decrease the remaining oil content to a great extent by the floating type separating means alone.

SUMMARY OF THE INVENTION

An object of this invention is to provide an apparatus which overcomes those difficulties in that, instead of parallel plates, a large number of small diameter pipes or the like are contained in parallel one with another in a large diameter pipe and are coiled in an annular form for forming in a coilded large diameter pipe extremely narrow and long parallel flow passages, so that the greater part of the oil content can be separated by floating, and thereafter the liquid is passed through a layer of a mixture of lipophilic and hydrophilic fibers so that fine particles of oil may be brought into contact with the surfaces of the fibers for being separated and removed by means of adsorption and aggregation.

This invention will next be described in detail with reference to the accompanying drawing.

BRIEF DESCRIPTION OF THE DRAWING

FIG. 2 is a sectional view taken along line II—II in FIG. 1;

FIG. 3. is a sectional side view, partly broken away, of a modified embodiment according to the invention.

DETAILED DESCRIPTION

Figure 1:
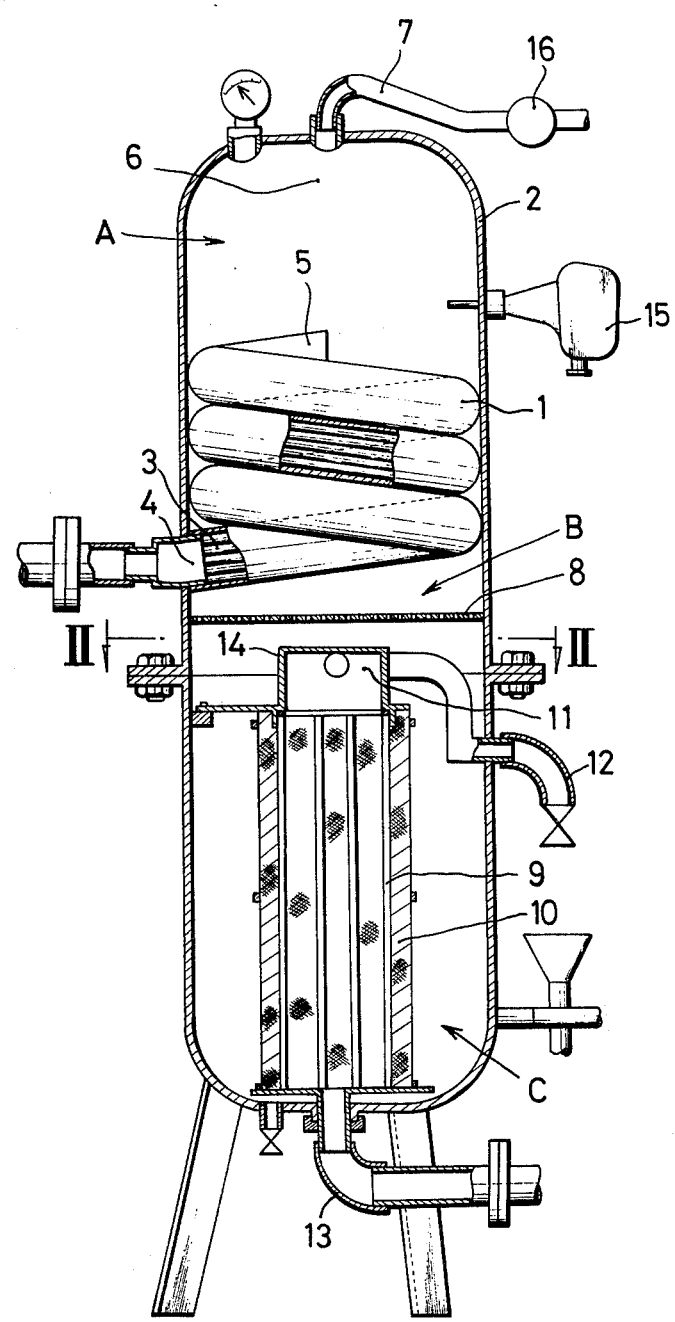
FIG. 1 is a sectional side view, partly broken away, of one embodiment according to the invention.

Referring to the drawings, numeral 1 denotes a large diameter pipe which is coiled annularly along an inner surface of an upper portion of a treating chamber 2 and the pipe 1 contains therein a large number of small diameter pipes 3 or wire members or the like arranged parallel with one another. The pipe 1 is connected at its lower end directly, as shown in FIG. 1, or through a header 17, as shown in FIG. 3, to an exterior pipe so as to form an inlet opening 4 for a liquid mixture of oil and water. The pipe 1 is open at its upper end 5 in an upper porion of chamber 2, so that there is formed a rough separating section A having at its upper region an oil accumulating portion 6 connected to an oil discharge pipe 7. A flow distribution plate 8 comprising a perforated plate of the like is mounted below the rough separating section A, so that there is formed a distribution section B for allowing roughly separated water to pass therethrough. A filter tube 9 of grid form covered with a filter layer 10 comprising a mixture of lipophilic fibers such as a polyolefin or the like and hydrophilic fibers such as of cellulose is mounted in the lower portion of the interior of the treating chamber 2 to form a fine separating section C having an upper oil accumulating portion 11 connected to an oil discharge pipe 12 and a separated water discharge pipe 13 at the bottom of section C.

In the apparatus of this invention, the pipe 1 with the large number of small diameter pipes 3 therein is coiled annularly along the inner surface of the treating chamber 2, so that these small diameter pipes form within pipe 1, a plurality of parallel, narrow-spaced and long flow passages. Accordingly, there can be assured within a small space of the treating chamber, a flow passage with a short floating distance and a long laminar flow which is beyond comparison with those in the conventional parallel plate separating means.

Accordingly, oil particles contained in the oil and water liquid mixture supplied into the pipe 1 flow through the long flow passage section while forming a laminar flow and float across each narrow space during travelling, so that the particles are aggregated or flocculated together on the upper surface thereof to form large particles which are discharged upwardly from the upper end 5 of pipe 1, and thus the greater part of the oil content is discharged externally through the oil accumulating portion 6 and the oil discharge pipe 7.

The rough separating section A has an oil level detecting means 15, and the oil discharge pipe 7 is provided with an electromagnetic valve 16 interposed therein, such that the valve 16 is opened upon operation of the oil level detecting means 15.

The water from which the oil content is roughly separated due to aggregation, as mentioned above, produces a turbulant flow when flowing out upwardly from the upper end 5, and the water is thereafter subjected to a buffer action by the perforated plate 8 constituting the distribution section B located below the rough separation section A, so that the water will be uniform in oil concentration and be smoothly supplied to the fine separating section C.

The filter tube 9 constituting the fine separating section C comprises a tube covered with the filter layer 10 made of a filter cloth of large thickness and small density such as a felt-like mixed cloth spun form an unwoven cloth or the like comprising a mixture of lipophilic fibers and hydrophilic fibers, so that fine particles of oil are selectively adsorbed on the surface of the lipophilic fibers in such a manner that the water received from the rough separating section A is passed through the filter layer 10. The particles of oil, thus adsorbed, grow gradually into large particles while passing through the filter layer 10 and such particles go into the filter tube 9 and are gathered in the oil accumulating portion 11 above the tube 9 for discharge to the exterior through the oil discharge pipe 12. The water content remaining on the surface of the filter tube 9 is accumulated at the lower portion of the filter tube 9 and is discharged to the exterior through the water discharge pipe 13. Thus the oil content in the water can be substantially removed.

The filter tube 10 in the apparatus of this invention is not limited in shape to a circular tube or a polyhedral tube, and the tube may have a large number of pleats for increasing the filtering area. As for the material for the filter layer 10 on the filter tube 9, there is used such a material that is small in density, that is, large in thickness and large in voids or porosity, so that the filter layer is good in oil adsorption but is not readily clogged. Additionally, the filter layer does not seek to separate oil and water by filtration but only to separate the oil by forming large particles by the action of the selective adsorption of the oil.

In the embodiment shown in FIGS. 1 and 2, the filter tube 9 is closed at its upper end by a covering plate 14 so that the oil accumulating portion 11 is formed above the interior of the filter tube 9. However, this can be modified as shown in FIG. 3. Namely, therein the filter tube 9 is open at its upper end and is closed at its upper outer peripheral region by an annular cover plate 14a, so that the oil accumulating portion 11 is formed at the ouside thereof. The liquid mixture is treated in this arrangement by flowing from the inside of the tube 9 to the outside thereof. Additionally, the pipe 1 constituting the rough section A can be so modified that, as shown in FIG. 3, two or more pipes 1 each containing a large number of small pipes or the like are used to form two or more coiled pipes. In this case, the open lower ends of the pipes are connected via header 17 to the exterior pipe. Also as seen in FIG. 3, the distributing layer may be composed of a thick coarse filter cloth 8' with a low density in lieu of the perforated plate 8.

The apparatus of the invention is prepared for use in such a condition that the treating chamber 2 is filled with water. The, the oil and water liquid mixture to be treated is supplied continuously into the inlet opening 4.

In the apparatus of the invention, the liquid flow passages formed within the pipe 1 constituting the rough separating section A become sustantially equal in length, so that uniform flow speeds can be obtained and suitable flow speeds can be assured, and thus any stagnation of the oil content within the pipe 1 can be prevented. The roughly separated water containing fine oil particles is distributed by the action of the distribution section B and only the oil content thereof is selectively separated by adsorption on the filter layer surface, so that the oil content can be removed almost completely.

According to this invention, as described above, the small diameter tubes (or wire members or the like) are parallel to one another in the pipe 1 and are coiled annularly, so that mounting of the large number of small diameter pipes or the like can be facilitated and the laminar flow passages for the liquid to be treated can be elongated and the floating distance of the oil content can be shortened. Thus the floating efficiency of the oil content in the oil and water mixture can be increased. Additionally, according to this invention, the water thus treated has the remaining oil content substantially removed by the action of adsorption by the filter layer of large thickness and small density comprising the mixture of lipophilic and hydrophilic fibers. Thus the apparatus can be made extremely small in size. Additionally, the construction is extremely simple, so that the manufacturing cost can be decreased considerably and the occupying space can be made very small whereby the field of utilization can be expanded and its economical effect in industry can be extremely great.

What is claimed is:

1. Apparatus for separating oil and water comprising a vertical treating chamber, an upwardly ascending helically coiled pipe disposed in said chamber, a plurality of parallel members in said pipe defining laminar flow passages therein, said pipe having first and second open upper and lower ends, means for supplying a mixture of oil and water to be separated from outside said chamber to one of said open ends of the pipe, said other open end of the pipe being open in said chamber for discharge thereto of agglomerated oil particles formed on said parallel members and separated water still containing fine oil particles, said treating chamber defining, above said other open end of the pipe, an oil accumulating portion for the agglomerated oil particles, means communicatin with said oil accumulation portion for discharging oil particles externally from the treating chamber, a flow distribution section in said chamber below said other open end of the pipe for receiving the separated water from said pipe, distributing means at the bottom of the flow distribution section for distribution of the separated water therebelow, a fine separating section in said treating chamber below said distributing means for receiving the separated water for removal of fine oil particles from said separated water, and a cyclindrical filter tube in said fine separating section including a wall constituted by a filter layer composed of a mixture of lipophilic and hydrophilic fibers through which said separated water flows such that the remaining fine oil particles in the separated water are adsorbed by the filter layer and agglomerate on one side of the filter tube and flow upwardly, means for receiving and discharging agglomerated oil particles externally of the treating chamber, and means for discharging water freed from the fine oil particles from the bottom of the fine separating section externally of the treating chamber.

2. Apparatus according to claim 1 wherein said one open end is the lower end of the coiled pipe and said other open end is the upper end of the coiled pipe.

3. Apparatus as claimed in claim 1 wherein said treating chamber has an inner surface and said coiled pipe extends along said inner surface.

4. Apparatus as claimed in claim 1 wherein two of said coiled pipes are disposed in said treating chamber.

5. Apparatus as claimed in claim 4 comprising a header connected to said pipes.

6. Apparatus as claimed in claim 1 comprising a cover plate on said filter tube defining an accumulating chamber for agglomerated fine oil particles communicating with the interior of the tube.

7. Apparatus as claimed in claim 1 wherein said filter tube has an open upper end for receiving the separated water from the distribution means, and an accumulating chamber for agglomerated fine oil particles external of said filter tube.

8. Apparatus as claimed in claim 1 wherein said distributing means comprises a perforated plate.

9. Apparatus as claimed in claim 1 wherein said distribution means comprises a filter cloth layer.

* * * * *